United States Patent
Brown et al.

(10) Patent No.: US 11,927,181 B2
(45) Date of Patent: Mar. 12, 2024

(54) SHAPE MEMORY ALLOY ACTUATION APPARATUS

(71) Applicant: CAMBRIDGE MECHATRONICS LIMITED, Cambridge (GB)

(72) Inventors: Andrew Brown, Cambridge (GB); Andreas Flouris, Cambridge (GB); James Howarth, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 751 days.

(21) Appl. No.: 17/253,326

(22) PCT Filed: Jun. 21, 2019

(86) PCT No.: PCT/GB2019/051762
§ 371 (c)(1),
(2) Date: Dec. 17, 2020

(87) PCT Pub. No.: WO2019/243842
PCT Pub. Date: Dec. 26, 2019

(65) Prior Publication Data
US 2021/0262453 A1    Aug. 26, 2021

(30) Foreign Application Priority Data
Jun. 21, 2018 (GB) .................... 1810218

(51) Int. Cl.
*F03G 7/06* (2006.01)
*G02B 7/04* (2021.01)

(52) U.S. Cl.
CPC .............. *F03G 7/065* (2013.01); *G02B 7/04* (2013.01)

(58) Field of Classification Search
CPC .................. F03G 7/065; G02B 7/04
(Continued)

(56) References Cited

U.S. PATENT DOCUMENTS

| 6,459,855 B1 | 10/2002 | Kosaka et al. |
| 2013/0300880 A1 | 11/2013 | Brown et al. |

(Continued)

FOREIGN PATENT DOCUMENTS

| CN | 104204935 A | 12/2014 |
| CN | 105793761 A | 7/2016 |

(Continued)

*Primary Examiner* — Wyatt A Stoffa
*Assistant Examiner* — Mitchell T Oestreich
(74) *Attorney, Agent, or Firm* — Haley Guiliano LLP

(57) ABSTRACT

An SMA actuation apparatus (1) comprises a support structure (2) and a movable element (3) supported thereon by a suspension system (8, 10) that supports the movable element on the support structure and guides movement of the movable element along a movement axis. Two closely spaced lengths of SMA wire (4) that are close to parallel and inclined at the same acute angle with respect to a plane normal to the movement axis are connected to the support structure and to the movable element so as to apply respective forces to the movable element with respective components parallel to the movement axis that are in opposite directions. The two lengths of shape memory alloy wire apply a couple to the movable element perpendicular to the movement axis and the suspension system includes a pair of flexures or bearings that resist the resultant couple applied to the movable element by the lengths of SMA wire.

19 Claims, 3 Drawing Sheets

(58) Field of Classification Search
USPC .......................................................... 359/823
See application file for complete search history.

(56) References Cited

U.S. PATENT DOCUMENTS

2015/0113974 A1    4/2015  Howarth
2016/0227088 A1    8/2016  Brown et al.

FOREIGN PATENT DOCUMENTS

| WO | WO 2010089529 | 8/2010 | |
| WO | WO-2010089529 A1 * | 8/2010 | ........... G02B 27/646 |
| WO | WO 2015036761 | 3/2015 | |
| WO | WO 2016189314 | 12/2016 | |
| WO | WO 2017134456 | 8/2017 | |

* cited by examiner

SHAPE MEMORY ALLOY ACTUATION APPARATUS

CROSS-REFERENCE TO RELATED APPLICATIONS

This application is a national stage application under 35 U.S.C. § 371 of International Application PCT/GB2019/051762, filed Jun. 21, 2019, which claims priority of GB Patent Application 1810218.6, filed Jun. 21, 2018. The disclosure of which are hereby incorporated by reference herein in their entireties.

The present techniques generally relate to a shape memory alloy (SMA) actuation apparatus in which lengths of SMA actuator wire drive movement of a movable element with respect to a support structure.

According to the present techniques, there is provided a shape memory alloy actuation apparatus comprising: a support structure; a movable element; a suspension system that supports the movable element on the support structure and is arranged to guide movement of the movable element with respect to the support structure along a movement axis and to constrain movement of the movable element with respect to the support structure along axes perpendicular to the movement axis; and two lengths of shape memory alloy wire each connected at one end to the support structure and at the other end to the movable element and arranged to apply forces to the movable element with respective components along the movement axis that are in opposite directions, the two lengths of shape memory alloy wire being inclined at a first acute angle greater than 0 degrees with respect to a plane normal to the movement axis, and being parallel, or being inclined from parallel by a second acute angle as projected on the plane normal to the movement axis, the two lengths of shape memory alloy wire applying a couple to the movable element perpendicular to the movement axis and the suspension system being arranged to resist the couple applied to the movable element by the two lengths of SMA wire.

Thus, the present techniques may use lengths of SMA wire that are inclined by being at a first acute angle with respect to a plane normal to the movement axis, thereby providing gain.

However, rather than using a single length of SMA wire, two lengths of SMA wire are used, being opposed in the sense of applying forces to the movable element in opposite directions along the movement axis. Rather than being crossed, the lengths of SMA wire are parallel or are inclined from parallel by a second acute angle, as projected on the plane normal to the movement axis. This means that the overall forces applied laterally of the movement axis by the two lengths of SMA wire will be reduced compared to use of a single length of SMA wire. This is because the respective components of force applied by the two lengths of SMA wire will be opposed, being in opposite directions in the case that the lengths of SMA wire are parallel, or at least having opposed components in the case that the lengths of SMA wire are inclined from parallel.

In addition, the overall SMA actuation apparatus may be compact. Although two lengths of SMA wire are used, they are parallel or close to parallel, and are arranged close together, so do not unduly increase the dimensions of the apparatus.

Even though the overall forces applied laterally of the movement axis are reduced, it remains the case that the lengths of SMA wire apply a couple to movable element perpendicular to the movement axis because they cannot occupy the same space. Herein, a couple is represented in the conventional manner as a vector that is the cross product of the vectors representing the forces that apply the couple.

However, this couple may be resisted by the suspension system.

The couple may be reduced by minimising the separation of the parallel lengths of SMA wire. For example, for use in portable devices such as miniature cameras in mobile phones, the diameter of the SMA wire may be low, for example at most 50 micron or preferably at most 25 micron. The minimum spacing between such wires is determined by the size of the fixing means, which fix the ends of the wires to the support and movable element, the fixing means in general being greater in extent than the wire diameter. The fixing means are typically crimps, which cannot be made smaller than the wire diameter. Preferably, the lengths of SMA wire are arranged so that the maximum separation therebetween is as small as possible, at most 2 mm or preferably at most 1 mm, more preferably at most 500 micron and most preferably at most 250 micron. Such a small separation may be achievable with appropriate crimping technology.

The suspension system may comprise a pair of flexures extending between the support structure and the movable element perpendicular to the movement axis and perpendicular to the axis of rotation of said resultant couple. Advantageously, flexures provide a suspension system that is relatively compact. Furthermore, as the pair of flexures extend perpendicular to the couple applied by the lengths of SMA wire to the movable element, the lateral forces generated in each flexure generate a reactive couple that resists the couple applied by the lengths of SMA wire.

To allow the flexures to provide the reactive couple and to allow their elastic constants to be minimised, the separation of the flexures may be increased. Advantageously, the separation between the flexures is at least three times, preferably at least ten times, the maximum separation between the lengths of SMA wire.

The flexures may be arranged outside the two lengths of shape memory alloy wire on opposite sides of the lengths of shape memory alloy wire along the movement axis. Advantageously, this minimises the lateral forces generated in each flexure in generating the reactive couple.

Advantageously, the suspension system may further comprise a bearing arrangement comprising plural bearings arranged to permit movement of the movable element with respect to the support structure along the movement axis, while constraining other undesired movements, for example translational movement of the movable element with respect to the support structure parallel to the axis of rotation of said resultant couple, rotational movement of the movable element with respect to the support structure around the movement axis, and rotational movement of the movable element with respect to the support structure around an axis perpendicular to both the movement axis and the axis of the couple.

The bearings may be rolling bearings comprising bearing surfaces on the support structure and the moveable element and at least one rolling bearing element disposed between the bearing surfaces, or may be other forms of bearing such as plain bearings, flexures, or flexing or hinged pins.

The movable element and the support structure may comprise respective facing plates and the bearing arrangement is arranged between the plates. Such a construction is compact, and the flexures may be formed integrally with one of the plates.

Preferred features of the present techniques are set out in the appended dependent claims.

Implementations of the present techniques will now be described, by way of example only, with reference to the accompanying drawings, in which.

Figure 1:
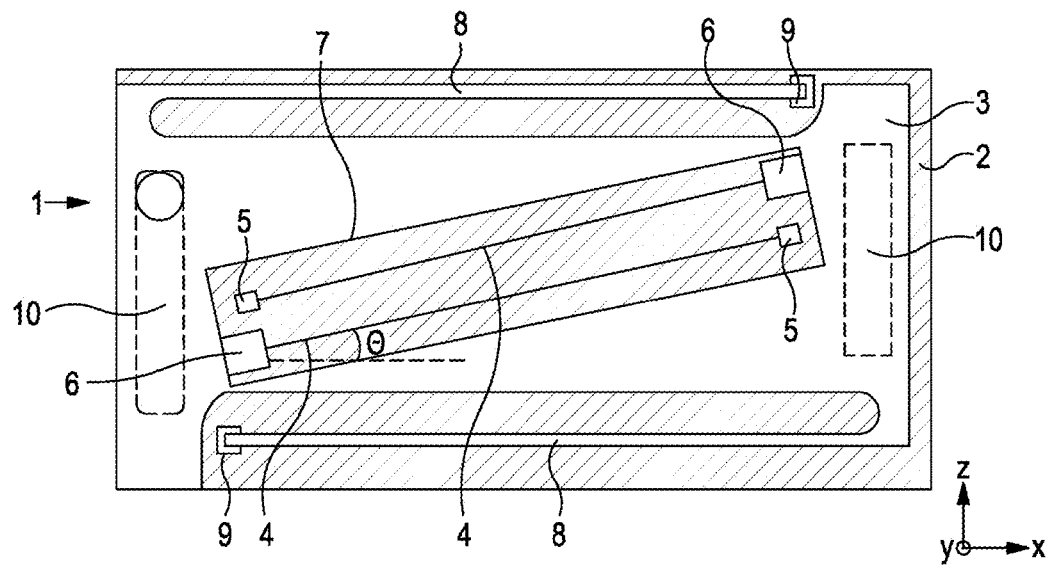
FIG. 1 is a side view of an SMA actuation apparatus.

It is known to use SMA actuator wires to drive translational movement of a movable element with respect to a support structure. SMA actuator wires have particular advantages in miniature devices and may be applied in a large range of consumer electronic devices including handheld devices, such as cameras and mobile phones.

Such SMA actuator wires may be used, for example in an optical device such as a camera for driving movement of a camera lens element along its optical axis, for example to effect focusing (autofocus, AF) or zoom (e.g. as disclosed in WO2007/113478, WO2009/056822 and WO2017/134456) or for driving movement of a camera lens element transverse to the optical axis, for example to provide optical image stabilisation (OIS) (e.g. as disclosed in WO2013/175197 and WO2014/083318). Such cameras may be small and relatively low cost and provide a great deal of functionality, being used not only to take photographs but also for video calls, scanning, object recognition, security etc. Besides use in an optical device, there are numerous other applications where similar advantages may be derived, for example other consumer electronic devices, haptics, medical devices, drug delivery, 3D sensing, valves, disk drives.

SMA provides a high force, but relatively low stroke. As a result it is desirable to use a mechanical means to amplify the distance moved, which will generally be at the expense of the force along the movement axis. Herein, the ratio of the amount of movement to the change in length of the SMA wire will be referred to as gain.

A known approach to provide gain is to incline the SMA wire at an acute angle greater than 0 degrees with respect to a plane normal to the movement axis, rather than along the movement axis. As a result, the SMA wire rotates when it contracts causing the amount of movement along the movement axis to be higher than the change in length.

However, use of a mechanical means to amplify the distance moved may make it harder to minimise overall size and may in general impact on the design of the suspension system by applying a lateral force on the suspension system that supports the movable element on the support structure. For example when the SMA wire is inclined with respect to the movement axis, a component of the applied force acts laterally of the movement axis against the suspension system. Such forces are relatively high and are undesirable for the different types of suspension system that may be selected. For example, in the case of a plain bearing such lateral forces increase frictional forces, in the case of a rolling bearing such lateral forces increase rolling forces, and in the case of flexures such lateral forces increase the required spring forces of the flexures.

It would therefore desirable to design an SMA actuator apparatus that provides gain, while minimising the impact on the functioning of the suspension system and/or the size of the apparatus.

Broadly speaking, the present techniques provide a shape memory alloy actuation apparatus that comprises lengths of SMA wire that are inclined by being at a first acute angle with respect to a plane normal to the movement axis, thereby providing gain.

An SMA actuation apparatus 1 is shown in FIG. 1. In all the drawings, X, Y and Z axis are shown.

The SMA actuation apparatus 1 comprises a support plate 2 which forms a support structure and a movable plate 3 that forms a movable element. The support plate 2 and the movable plate 3 are flat parallel sheets that face each other. A suspension system, that comprises a pair of flexures 8 and a bearing arrangements comprising two inter-plate bearings 10 described in more detail below, supports the movable plate 3 on the support plate 2 and guides movement of the movable plate 3 with respect to the support plate 2 along the Z axis which is the movement axis in this example. As described further below, the suspension system constrains translational movement of the movable plate 3 with respect to the support plate 2 along the X and Y axes which are perpendicular to the Z axis.

Two lengths of SMA wire 4 are arranged as follows to drive movement of the movable plate 3 with respect to the support plate 2 along the movement axis. The lengths of SMA wire 4 are separate pieces of SMA wire, each connected at one end to the support plate 2 by first crimp portions 5 and at the other end to the movable plate 3 by second crimp portions 6. The first and second crimp portions 5 and 6 crimp the lengths of SMA wire 4 to provide both mechanical and electrical connection. The lengths of SMA wire 4 are arranged in an aperture 7 in the movable plate 3 in order to minimise the thickness of the SMA actuation apparatus along the Y axis, but they could equally be provided between the support plate 2 and the movable plate 3 as viewed along the Z axis.

The two lengths of SMA wire 4 are inclined at the a first acute angle $\theta$ with respect to a plane normal to the Z axis. The first acute angle $\theta$ is greater than 0 degrees so that it applies a component of force to the support plate 2 and the movable plate 3 along the Z axis, and so can drive movement along the Z axis. However, inclination of the SMA wires 4 at the first acute angle $\theta$ provides gain as the SMA wires 4 rotate when they contract to drive the relative movement, thereby causing the amount of relative movement along the Z axis to be higher than the change in length of the wire.

The choice of the first acute angle $\theta$ sets the gain, with lower values providing greater gain at the expense of actuation force. To first order the gain is given by $1/\sin(\theta)$. By way of example, in the arrangement shown in FIG. 1, the first acute angle $\theta$ is 10 degrees and so the gain is around 5.7. To maximise the gain, advantageously the first acute angle is at least 5 degrees, providing a gain of about 11. To ensure sufficient force to drive the relative movement, advantageously, the first acute angle is at most 25 degrees, providing a gain of around 2.4.

The two SMA wires 4 are under tension and are opposed in the sense that they apply forces to the movable plate 3 with respective components parallel to the Z axis that are in opposite directions. That is, as viewed in FIG. 1, the SMA wire 4 that is uppermost is connected to the movable plate 3 at its upper end and so applies a force on the movable plate 3 with a downwards component along the Z axis, and the SMA wire 4 that is lowermost is connected to the movable plate 3 at its lower end and so applies a force on the movable plate 3 with an upwards component along the Z axis. Thus, the SMA wires 4 drive movement of the movable plate 3 in opposite directions along the Z axis.

In use, the lengths of SMA wire 4 drive movement of the movable plate 3 along the Z axis on application of drive signals that cause heating and cooling of the lengths of SMA wire 4, with the lengths of SMA actuator wire 4 contracting on heating and expanding under an opposing force on cooling. The lengths of SMA wire 4 are resistively heated by the drive signals and cool by thermal conduction to the surroundings when the power of the drive signals is reduced. The position of the movable plate 3 along the Z axis is selected by differential control of the two SMA wires 4.

In the SMA actuation apparatus 1, the two lengths of SMA wire 4 are located close together and are parallel or inclined from parallel, as described further below.

Figure 2:
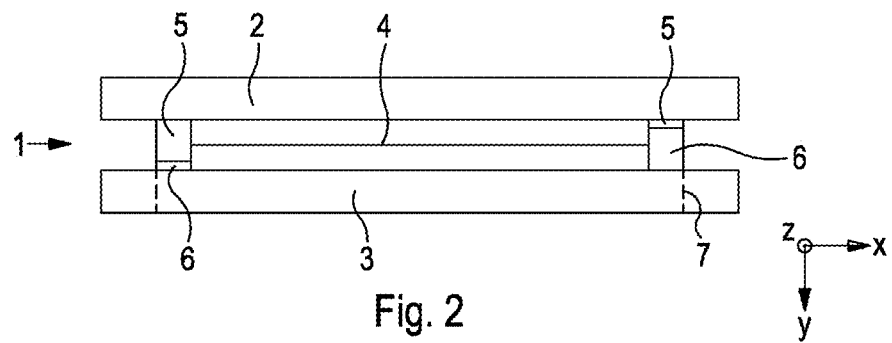
FIG. 2 is plan view of a configuration of SMA wires that may be used in the SMA actuation apparatus.

FIG. 2 illustrates a first possible configuration of the SMA actuation apparatus 1 in which the two lengths of SMA wire 4 are parallel (the inter-plate bearings 10 described below being omitted in FIG. 2 for clarity). In this case, the first and second crimp portions 5 and 6 are configured to hold the SMA wires 4 away from the support plate 2. In this case, the overall forces by the two lengths of SMA wire 4 applied between the support plate 2 and the movable plate 3 laterally of the Z axis which is the movement axis will be reduced compared to use of a single length of SMA wire. This is because the lateral components of force, along the X axis in this example, in opposite directions (left and right in FIGS. 1 and 2) and will tend to cancel. There will be a residual differential force developed when the position of the movable plate 3 is changed, but this is easily resisted by the suspension system as described below.

Figure 3:
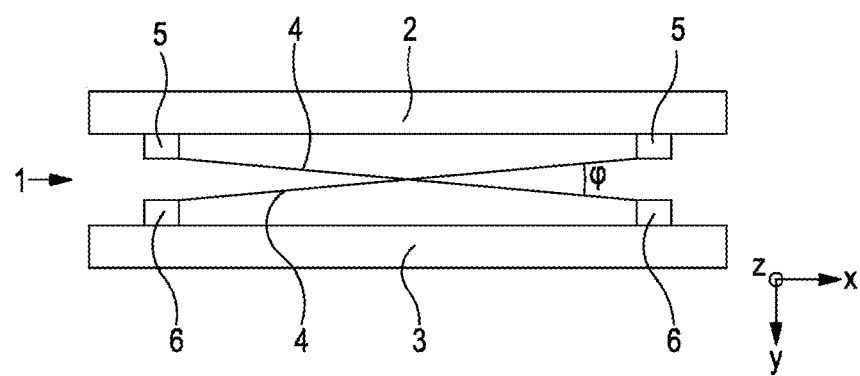
FIG. 3 is plan view of an alternative configuration of SMA wires that may be used in the SMA actuation apparatus.

As an alternative, FIG. 3 illustrates a second possible configuration of the SMA actuation apparatus 1 in which the two lengths of SMA wire 4 are inclined from parallel by a second acute angle (p, as projected on the plane normal to the Z axis which is the movement axis (the inter-plate bearings 10 described below being omitted in FIG. 3 for clarity). In this case, the overall forces by the two lengths of SMA wire 4 applied between the support plate 2 and the movable plate 3 laterally of the Z axis which is the movement axis will be reduced compared to use of a single length of SMA wire. This is because the lateral components of force include components along the X axis in opposite directions (left and right in FIGS. 1 and 2) which will tend to cancel in a similar manner to the first possible configuration of FIG. 2.

The lateral components of force also include components along the Y axis which act in the same direction but these are lower than the lateral forces when a single length of SMA wire due to the inclination from parallel by the second acute angle φ. Such forces along the Y axis are minimised by reducing the second acute angle φ, which preferably has a value of at most 10 degrees, more preferably at most 5 degrees. Such a force along the Y axis may be advantageous as it may ensure that the movable element 3 is pressed on to the support structure 2 via the inter-plate bearings 10. However, too large a force is deleterious, as it hinders the operation of the inter-plate bearings 10.

Even though the overall lateral forces are reduced, the two lengths of SMA wire 4 apply a couple to the moving plate 3, as they are not coaxial. This couple is generated by the components of force applied by the lengths of SMA wire 4 in opposite directions, that is the components of force in the X-Z plane in both the first and second possible configurations of FIGS. 2 and 3.

In the first possible configuration of FIG. 2, the lengths of SMA wire 4 both lie in the X-Z plane and so apply no forces along the Y axis, the entire force being in the X-Z plane.

In the second possible configuration of FIG. 3, the components of force applied by the lengths of SMA wire 4 along the Y axis are in the same direction and so do not generate a couple. Thus, the couple is generated by the components of the forces applied in the X-Z plane.

Thus, the couple generated by the forces in the X-Z plane is along the Y axis, that is using the conventional representation of a couple as a vector that is the cross product of the vectors representing the forces, which in this example is perpendicular to the plane containing the forces, and in the direction shown by the right hand rule, that is around the axis about which the couple tends to drive rotation. Thus, the couple is perpendicular to the movement axis (being the Z axis in this example). couple is represented in the conventional manner as a vector that is the cross product of the vectors representing the forces that apply the couple By way of example, in the SMA actuation apparatus 1 the couple is anti-clockwise as viewed in FIG. 1.

This couple may be reduced by minimising the separation between the lengths of SMA wire 4. For example, the lengths of SMA wire 4 may be arranged so that the maximum separation therebetween is at most 2 mm, preferably at most 1 mm, more preferably at most 500 micron and most preferably at most 250 micron.

However, there is a physical limit on the minimum separation between the lengths of SMA wire 4. In practical terms, the physical limit is normally provided by the minimum size of the first and second crimp portions 5 and 6 needed to perform the crimping function. As a result, there remains a resultant couple which the suspension system is arrange to resist, as will now be described.

The suspension system comprises a pair of flexures 8 extending between the support plate 2 and the movable plate 3. In this example, the flexures 8 are formed integrally with the movable plate 3 and so are integrally connected thereto at one end. The flexures 8 are connected to the support plate 2 at the other end by a mechanical connection 9, such as welding, soldering or adhesive. This construction is merely an example and alternative constructions could be applied, for example with the flexures 8 being integrally formed with the support plate 2 or being separate elements from both the support plate 2 and movable plate 3.

The flexures 8 are disposed outside the lengths of SMA wire 4 on opposite sides of the lengths of SMA wire 4 along the Z (movement) axis. The flexures 8 extend along the X axis, that is perpendicular to the Z axis which is the movement axis and perpendicular to the Y axis which is the direction of the couple created by the lengths of the SMA wire 4. Thus, the flexures 8 guide movement along the Z axis by bending of the flexures in the X-Z plane. The flexures 8 provide this function with a construction that is relatively compact.

Furthermore, due to the stiffness of the material along their length, the flexures 8 generate forces along their length which both (1) constrain translational movement of the movable plate 3 with respect to the support plate 2 along the X axis which is perpendicular to the movement axis (being the Z axis in this example), and (2) generate a reactive couple that resists the resultant couple generated by the lengths of SMA wire 4. In the example shown in FIG. 1, as the couple generated by the lengths of SMA wire 4 is anti-clockwise, the flexures 8 are each in extension along their length. However, that is not essential and as an alternative, one or each flexure 8 could extend in the opposite direction from the support plate 2 to the movable plate 3 so that the or each flexure 8 is in compression along its length.

It is desirable to minimise the forces generated along the lengths of the flexures 8 when the reactive couple is generated. This has the benefit of minimising the elastic constants of the flexures 8. This is facilitated by the flexures 8 being arranged outside the two lengths of SMA wire 4 on opposite sides of the lengths of SMA wire 4 along the Z axis. In general, this makes it desirable to increase the separation between the flexures 8.

In practice the separation of the flexures 8 is a balance between increasing the separation in order to minimise the elastic constants and decreasing the separation of the flexures 8 in order to minimise the overall size of the SMA actuation apparatus 1 along the Z axis. By way of example, in the arrangement shown in FIG. 1, the separation between the flexures 8 is about seven times the spacing between the SMA wires 8. In general, the separation between the flexures 8 is preferably at least three times the maximum separation between the lengths of SMA wire 4, more preferably at least ten times the maximum separation between the lengths of SMA wire 4.

Although the use of the flexures 8 is advantageous in being compact and convenient to manufacture, as an alternative the flexures 8 could be replaced by respective bearings, for example a rolling bearing or a plain bearing, which provides the same function of guiding movement along the Z axis and generating forces along the X axis that which generate a reactive couple to resist the resultant couple generated by the lengths of SMA wire 4.

Figure 4:
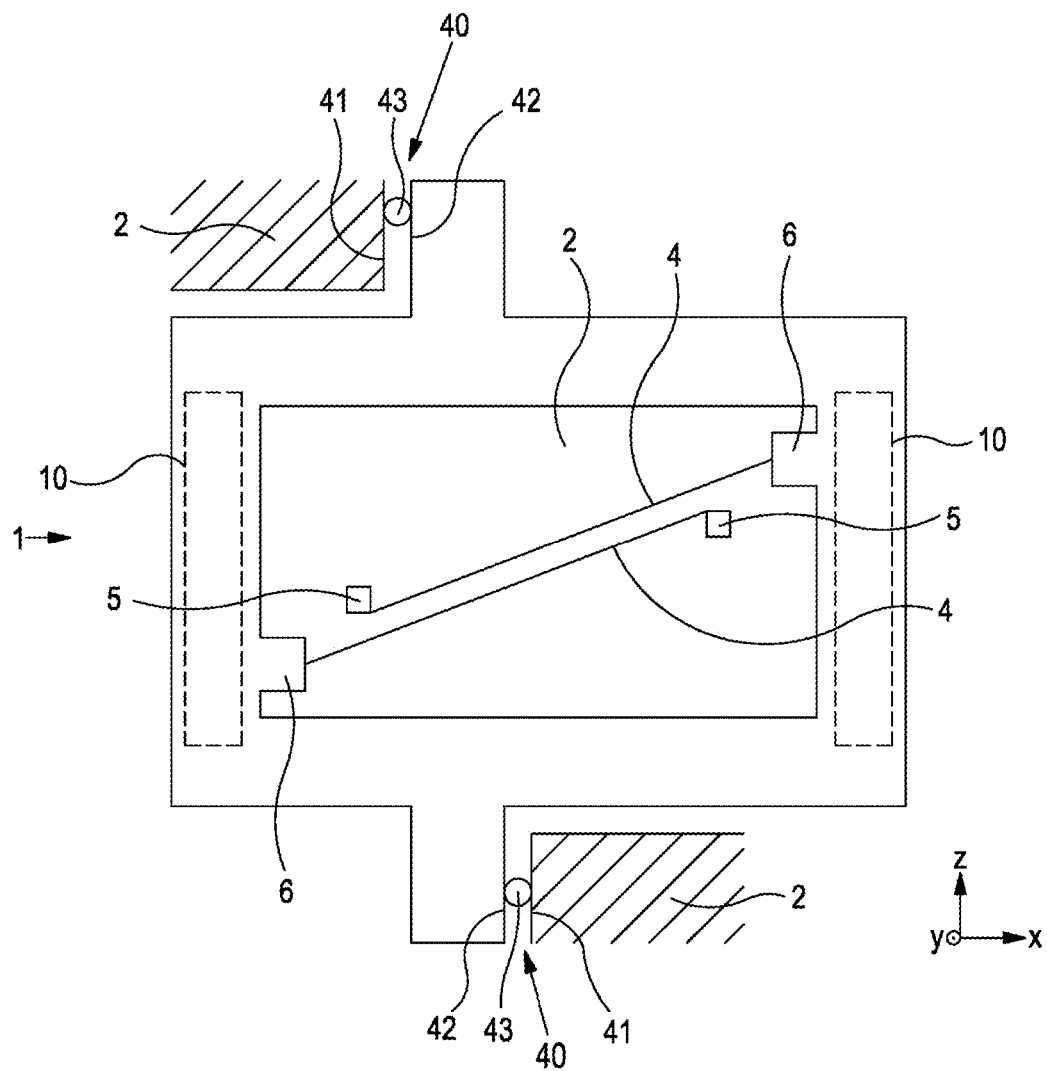
FIG. 4 is a side view of the SMA actuation apparatus with a modified form of suspension system.

By way of example, the SMA actuation apparatus 1 may have a modified form of suspension system as shown in FIG. 4. In this example, the flexures 8 are replaced by lateral bearings 40 that are rolling bearings. Otherwise the SMA actuation apparatus 1 has the same construction as described herein. Each lateral bearing 40 comprises a bearing surface 41 formed on the support plate 2, a bearing surface 42 formed on the moveable plate 3, and a rolling bearing element 43 disposed between the bearing surfaces 41 and 42. The rolling bearing element 43 may be a ball or a roller, and may be made of metal. The bearing surfaces 41 may similarly be made of metal.

In this example, each lateral bearing 40 is shown as having a single rolling bearing element 43, although in general there may be any number of one or more rolling bearing elements 43.

The lateral bearings 40 are disposed outside the lengths of SMA wire 4 on opposite sides of the lengths of SMA wire 4 along the Z axis which is the movement axis in this example. The bearing surfaces 41 and 42 extend in the Y-Z plane, perpendicular to the X axis and thus guide movement along the Z axis while constraining translational movement of the movable plate 3 with respect to the support plate 2 along the X axis which is perpendicular to the movement axis (being the Z axis in this example). Furthermore, the bearing surfaces 42 formed on the moveable plate 3 of each lateral bearing 40 face in opposite directions, so that the reaction forces provided by the two bearings provide a reactive couple that resists the resultant couple generated by the lengths of SMA wire 4. Thus, the lateral bearings 40 have the same function as the flexures 8 shown in FIG. 1, as described above.

In addition to the flexures 8 (or lateral bearings 40 in the modified form of suspension system), the suspension system comprises a bearing arrangement of two inter-plate bearings 10 which are arranged as follows to permit movement of the movable plate 3 with respect to the support plate 2 along the Z axis, while constraining other undesired movements that are not constrained by the flexures 8. Thus, the bearing arrangement of two inter-plate bearings 10 constrains translational movement of the movable plate 3 with respect to the support plate 2 along the Y axis which is perpendicular to the movement axis (being the Z axis in this example). The inter-plate bearings 10 may be rolling bearings or plain bearing elements, as described in more detail below. Each of the two inter-plate bearings 10 may extend along the Z axis so as to permit movement of the movable plate 3 with respect to the support plate 2 along the Z axis. There may be more than 2 bearings, and preferably they are spaced apart as far as possible within the extent of the actuator.

The inter-plate bearings 10 are arranged between the support plate 2 and the movable plate 3 which is convenient due to their nature as planar sheets extending parallel to the Z axis which is the movement axis. Accordingly, the inter-plate bearings 10 constrain translational movement of the movable plate 3 with respect to the support plate 2 along the Y axis, that is parallel to the resultant couple generated by the lengths of SMA wire 4. In particular, in the second possible configuration of FIG. 3, the inter-plate bearings 10 generate a reactive force that resists the components of force applied by the lengths of SMA wire 4 in the same direction along the Y axis.

As described in more detail below, the inter-plate bearings 10 have a linear extent along the Z axis so that the reactive forces within each inter-plate bearing 10 constrain rotational movement of the movable plate 3 with respect to the support plate 3 about the X axis which is perpendicular to the Z axis which is the movement axis and is perpendicular to the couple generated by the lengths of SMA wire 4 along the Y axis.

The two inter-plate bearings 10 are spaced apart along the X axis, in this example being arranged outside the lengths of SMA wire 4 on opposite sides of the lengths of SMA wire 4 along the X axis. As a result, the reactive forces generated within the inter-plate bearings 10 act together to constrain rotational movement of the movable plate 3 with respect to the support plate 2 about the Z axis which is the movement axis.

Figure 5:
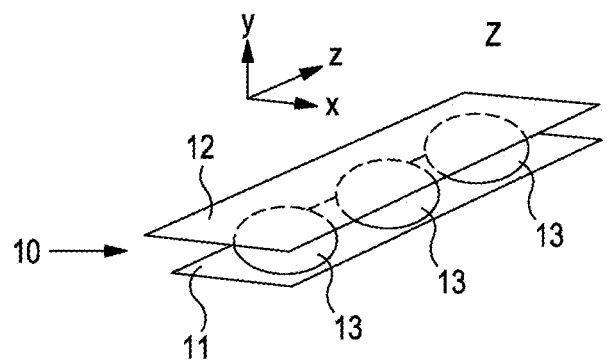
FIG. 5 is perspective view of a rolling bearing that may be used in the SMA actuation apparatus.

FIG. 5 shows an example of one of the inter-plate bearings 10 that is a rolling bearing. In this case, the inter-plate bearing 10 comprises a bearing surface 11 formed on the support plate 2, a bearing surface 12 formed on the moveable plate 3 and plural rolling bearing elements 13 disposed between the bearing surfaces 11 and 12. The bearing surfaces 11 and 12 extend in the X-Z plane, perpendicular to the Y axis. The rolling bearing elements 13 may be balls or rollers, and may be made of metal. The bearing surfaces 11 and 12 may similarly be made of metal.

In this example, three rolling bearing elements 13 are provided, although in general there may be any number of one or more rolling bearing elements 13. By forming the inter-plate bearing 10 with plural rolling bearing elements 13, the inter-plate bearing 10 generates reactive forces along the Y axis that constrain the rotational movement about the X axis. This is predominantly achieved by the rolling bearing elements 13 at each end of the inter-plate bearing 10. Accordingly, where three or more rolling bearing elements 13 are provided, the rolling bearing elements 13 predominantly act as spacers and may optionally be smaller than the rolling bearing elements 13 at each end of the inter-plate bearing 10.

Figure 6:
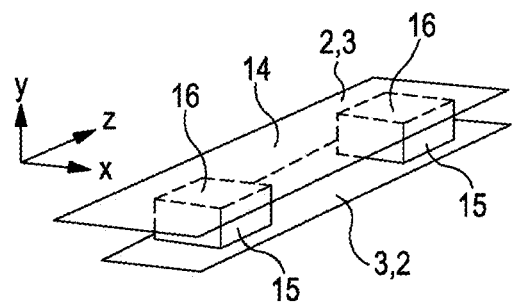
FIG. 6 is perspective view of a plain bearing that may be used in the SMA actuation apparatus.

FIG. 6 shows an example of one of the inter-plate bearings 10 that is a plain bearing. In this case, the inter-plate bearing 10 comprises an elongate bearing surface 14 formed on either one of the support plate 2 and the moveable plate 3, and pads 15 that protrude from the other one of the support plate 2 and the moveable plate 3. The bearing surfaces 14 extend in the X-Z plane, perpendicular to the Y axis. Each pad 15 has a bearing surface 16 (shown cross-hatched in FIG. 6) that bears on the elongate bearing surface 14. The elongate bearing surface 14 and the bearing surfaces 16 of the pads 15 are conformal, both being planar in this example, so as to permit relative movement of the movable plate 3 with respect to the support plate 2 along the Z axis. The elongate bearing surface 14 and the bearing surfaces 16 of the pads 15 desirably have a coefficient of friction of 0.2 or less.

In this example, two pads 15 are provided, although in general there may be any number of pads 15. By forming the inter-plate bearing 10 with plural separated pads 15, or alternatively with a single pad 15 having a sufficient extent along the Z axis, the inter-plate bearing 10 generates reactive forces along the Y axis that constrain the rotational movement about the X axis.

Figure 7:
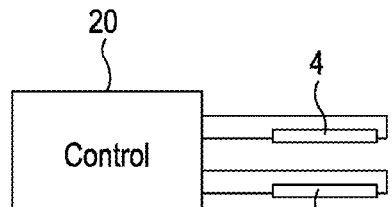
FIG. 7 is a diagram of a control circuit of the SMA actuation apparatus.

The SMA actuation apparatus 1 has a control circuit 20 as shown in FIG. 7. The control circuit 20 is connected to the lengths of SMA wire 4. The control circuit 20 may for example be implemented in an IC chip that may be mounted to the support plate 3 or located elsewhere with appropriate electrical connections.

The control circuit 20 generates the drive signals and supplies them to the lengths of SMA actuator wire 4. The control circuit 20 receives an input signal representing a desired position for the movable plate 3 with respect to the support plate 2 along the Z axis and generates drive signals having powers selected to drive the movable plate 3 to that desired position. The power of the drive signals may be either linear or varied using pulse width modulation.

In one form of the control circuit 20, the drive signals may be generated using a resistance feedback control technique, in which case the control circuit 20 measures the resistance of the lengths of SMA wire 4 and uses the measured resistance as a feedback signal to control the power of the drive signals. Such a resistance feedback control technique may be implemented as disclosed in any of WO2013/175197; WO2014/076463; WO2012/066285; WO2012/020212; WO2011/104518; WO2012/038703; WO2010/089529 or WO2010029316, each of which is incorporated herein by reference in its entirety.

In another form of the control circuit 20, the drive signals may be generated using closed-loop control based on the output of a sensor which senses the position of the movable plate 3 with respect to the support plate 2. Such a sensor may be, for example, a Hall sensor mounted on one of the support plate 2 and the moveable plate 3 and which detects the position of a magnet mounted on the other one of the support plate 2 and the moveable plate 3.

As discussed above, the SMA actuation apparatus 1 provides advantages of achieving high forces associated with SMA wire providing gain with a minimal impact on the suspension system, all in a compact and convenient package. In general, the SMA actuation apparatus 1 may be applied in any application to obtain these benefits.

Figure 8:
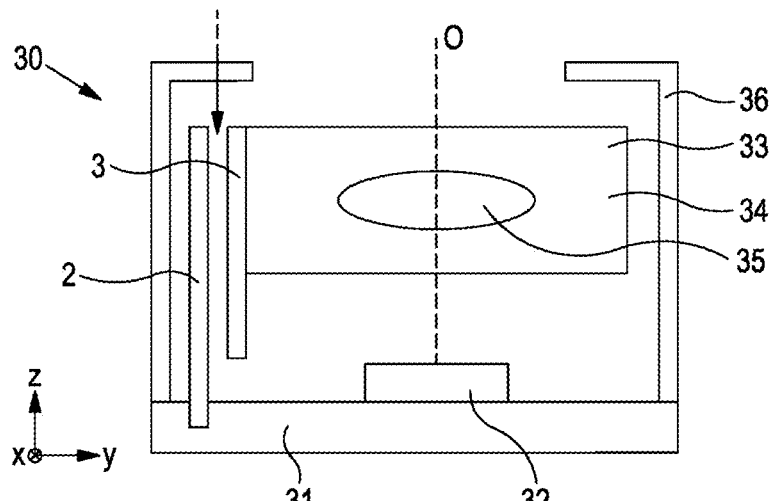
FIG. 8 is a side view of a camera in which the SMA actuation apparatus is implemented.

By way of non-limitative example, the SMA actuation apparatus 1 may be applied in an optical device. As an example of this, the SMA actuation apparatus 1 may be applied in a camera 30 as shown in FIG. 8 and arranged as follows.

In the camera 30, the support structure is formed by the support plate 2 and a base 31 to which the support plate 2 is fixed. The base 31 has an image sensor 32 mounted thereon.

In the camera 30, the movable element is formed by the movable plate 3 and a lens element 33 to which the movable plate 3 is fixed. The lens element 33 comprises a lens carriage 34 holding at least one lens 35. The lens element 33 has an optical axis O aligned with the image sensor 32 so that the lens element 33 focuses an image on the image sensor 32. The lens element 33 is fixed to the movable plate 3 to align the optical axis O of the lens element 33 with the Z axis of the SMA actuation apparatus 1 which is the movement axis. Accordingly, the SMA actuation apparatus 1 in use drives movement of the lens element 33 along the optical axis O to change the focus of the image, for example for focusing or magnification.

The camera 30 also includes a shield can 36 that fits to the base 31 and covers all the other components to provide protection against physical damage and ingress of dust.

The camera 30 is a miniature optical device. In some examples of such a miniature optical device, the at least one lens 35 may have a diameter of at most 20 mm, preferably at most 15 mm, more preferably at most 10 mm.

The SMA actuation apparatus 1 may similarly be applied in other types of miniature optical device for driving movement of a lens element along the optical axis, including devices with no image sensor.

Other applications for the SMA actuation apparatus 1 include, for example other consumer electronic devices, haptics, medical devices, drug delivery, 3D sensing, valves, and disk drives.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A shape memory alloy (SMA) actuation apparatus comprising:
   a support structure;
   a movable element;
   a suspension system that supports the movable element on the support structure and is arranged to guide movement of the movable element with respect to the support structure along a movement axis and to constrain movement of the movable element with respect to the support structure along axes perpendicular to the movement axis; and
   two lengths of shape memory alloy wire each connected at one end to the support structure and at the other end to the movable element arranged to apply respective forces to the movable element with respective components parallel to the movement axis that are in opposite directions, the two lengths of shape memory alloy wire being inclined at a first acute angle greater than 0 degrees with respect to a plane normal to the movement axis, and being parallel, or being inclined from parallel by a second acute angle as projected on the plane normal to the movement axis, the two lengths of shape memory alloy wire applying a couple to the movable element perpendicular to the movement axis and the suspension system being arranged to resist the couple applied to the movable element by the two lengths of SMA wire.

2. The shape memory alloy actuation apparatus according to claim 1, wherein the first acute angle is at least 5 degrees.

3. The shape memory alloy actuation apparatus according to claim 1, wherein the first acute angle is at most 25 degrees.

4. The shape memory alloy actuation apparatus according to claim 1, wherein the second acute angle is at most 10 degrees.

5. The shape memory alloy actuation apparatus according to claim 1, wherein the maximum separation between the lengths of shape memory alloy wire is at most 2 mm, preferably at most 1 mm, more preferably at most 500 microns, and more preferably still at most 250 microns.

6. The shape memory alloy actuation apparatus according to claim 1, wherein the lengths of SMA wire are connected to the support structure and to the movable element by crimp portions.

7. The shape memory alloy actuation apparatus according to claim 1, wherein the suspension system comprises a pair of flexures extending between the support structure and the movable element perpendicular to the movement axis and perpendicular to said resultant couple.

8. The shape memory alloy actuation apparatus according to claim 1, wherein the suspension system comprises bearings between the support structure and the movable element arranged to resist said resultant couple.

9. The shape memory alloy actuation apparatus according to claim 7, wherein the separation between the flexures is at least three times, preferably at least ten times, the maximum separation between the lengths of shape memory alloy wire.

10. The shape memory alloy actuation apparatus according to claim 7, wherein the flexures are arranged outside the two lengths of shape memory alloy wire on opposite sides of the lengths of shape memory alloy wire along the movement axis.

11. The shape memory alloy actuation apparatus according to claim 7, wherein the suspension system further comprises a bearing arrangement comprising plural bearings arranged to permit movement of the movable element with respect to the support structure along the movement axis, while constraining translational movement of the movable element with respect to the support structure parallel to said resultant couple, rotational movement of the movable element with respect to the support structure around the movement axis, and rotational movement of the movable element with respect to the support structure around an axis perpendicular to both the movement axis and the couple.

12. The shape memory alloy actuation apparatus according to claim 11, wherein the bearings each comprise a rolling bearing.

13. The shape memory alloy actuation apparatus according to claim 11, wherein the bearings each comprise a plain bearing.

14. The shape memory alloy actuation apparatus according to claim 7, wherein the movable element and the support structure comprise respective facing plates and the bearing arrangement is arranged between the plates.

15. The shape memory alloy actuation apparatus according to claim 14, wherein the flexures are formed integrally with one of the plates.

16. The shape memory alloy actuation apparatus according to claim 1, wherein the movable element is a lens element comprising at least one lens.

17. The shape memory alloy actuation apparatus according to claim 16, wherein the movement axis is along the optical axis of the lens element.

18. The shape memory alloy actuation apparatus according to claim 16, wherein the support structure has an image sensor mounted thereon, the lens element being arranged to focus an image on the image sensor.

19. The shape memory alloy actuation apparatus according to claim 16, wherein the at least one lens has a diameter of at most 20 mm.

* * * * *